(No Model.) 4 Sheets—Sheet 1.

J. C. CORAM.
MACHINE FOR MAKING PAPER CONES.

No. 540,238. Patented June 4, 1895.

Witnesses
Kirkley J Hyde.
Myrtie C. Beals.

Inventor
John C. Coram,
By Albert M. Moore,
His Attorney.

(No Model.) 4 Sheets—Sheet 2.

J. C. CORAM.
MACHINE FOR MAKING PAPER CONES.

No. 540,238. Patented June 4, 1895.

Witnesses
Kirtley S Hyde.
Myrtie C. Beals

Inventor
John C. Coram,
By Albert M. Moore,
His Attorney.

(No Model.) 4 Sheets—Sheet 3.

J. C. CORAM.
MACHINE FOR MAKING PAPER CONES.

No. 540,238. Patented June 4, 1895.

Witnesses
Kirkley S Hyde.
Myrtie E. Beals.

Inventor
John C. Coram,
By Albert M. Moore,
His Attorney.

THE NORRIS PETERS CO., PHOTO-LITHO., WASHINGTON, D. C.

(No Model.) 4 Sheets—Sheet 4.

J. C. CORAM.
MACHINE FOR MAKING PAPER CONES.

No. 540,238. Patented June 4, 1895.

Witnesses
Kirkley Hyde.
Myrtie C. Beals.

Inventor
John C. Coram,
By Albert M. Moore,
His Attorney.

UNITED STATES PATENT OFFICE.

JOHN C. CORAM, OF LOWELL, MASSACHUSETTS.

MACHINE FOR MAKING PAPER CONES.

SPECIFICATION forming part of Letters Patent No. 540,238, dated June 4, 1895.

Application filed July 27, 1892. Serial No. 441,387. (No model.)

*To all whom it may concern:*

Be it known that I, JOHN C. CORAM, a citizen of the United States, residing at Lowell, in the county of Middlesex and Commonwealth of Massachusetts, have invented a certain new and useful Improvement in Machines for Making Paper Cones and Tubes, of which the following is a specification.

My invention relates to machines for making paper cones and tubes and consists in the combinations and devices hereinafter described and claimed; the same being adapted to take a previously-shaped paper blank, wind it about a spindle, apply paste to the outer side of the blank while the same is being wound, to lay the lap, to smooth the outer surface of the cone or tube and remove surplus paste, and to strip the finished cone or tube from the spindle.

Figure 1:
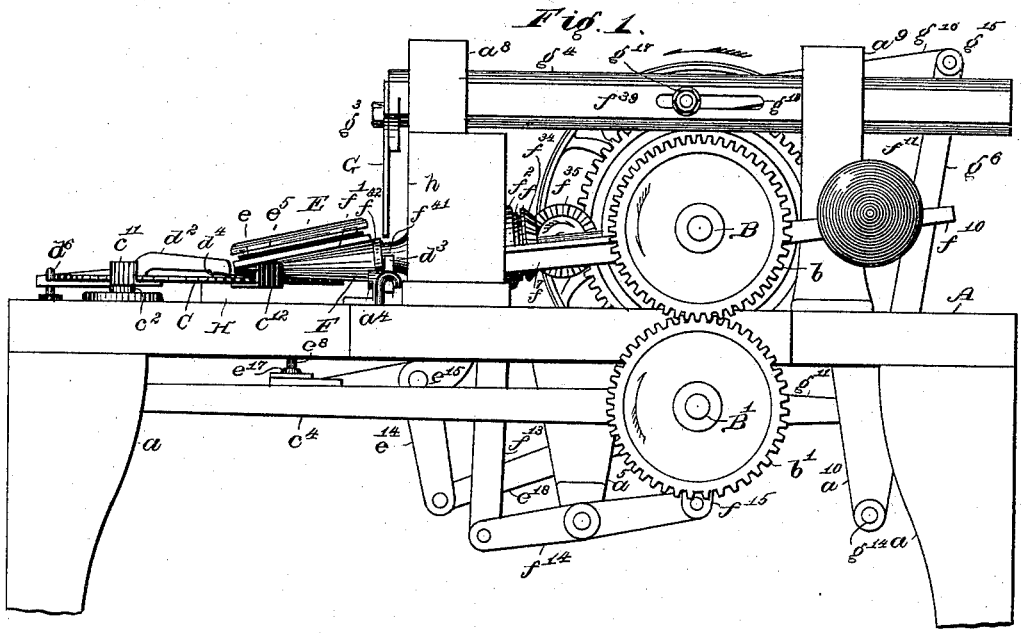
Figure 2:
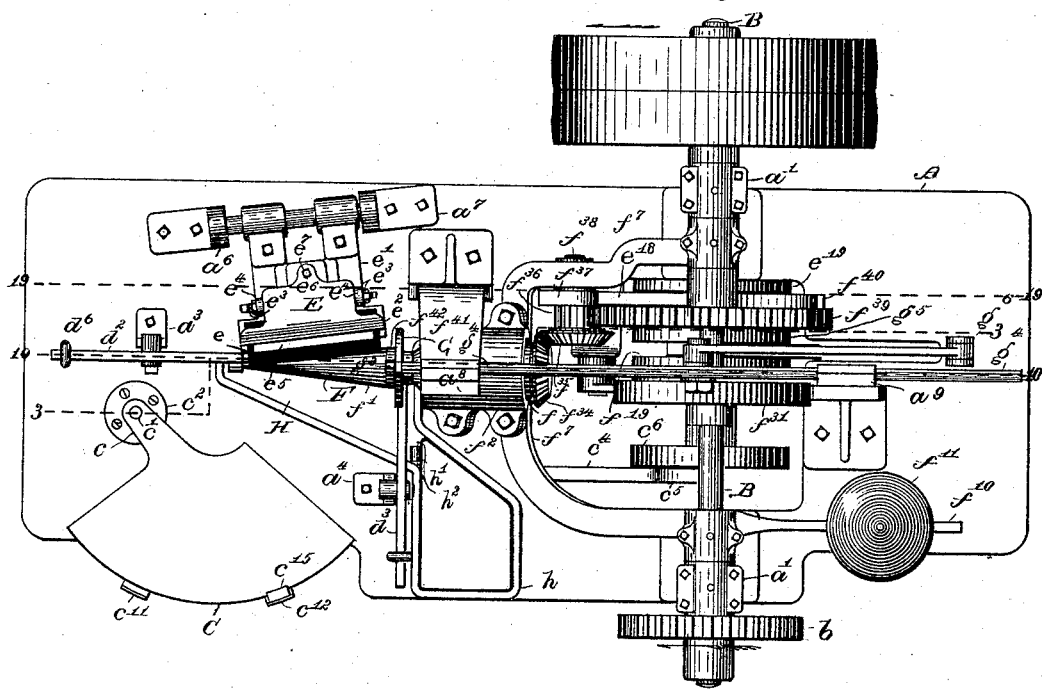
Figure 3:
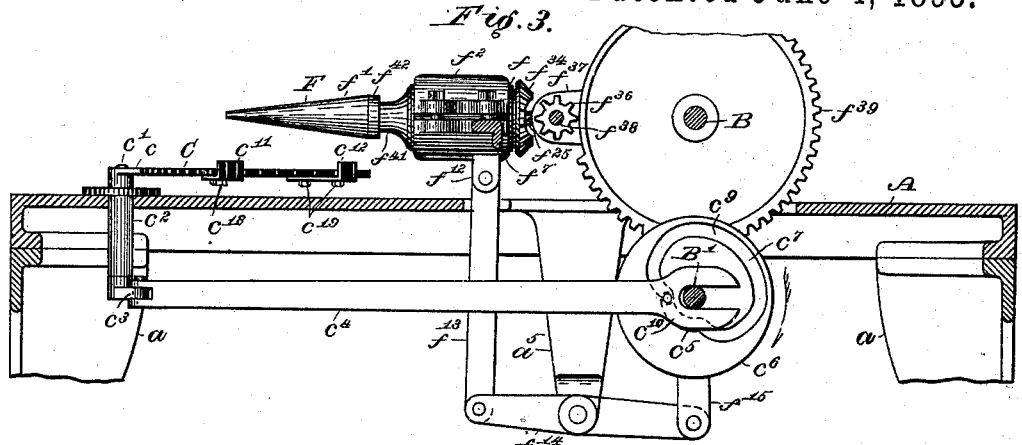
Figure 4:
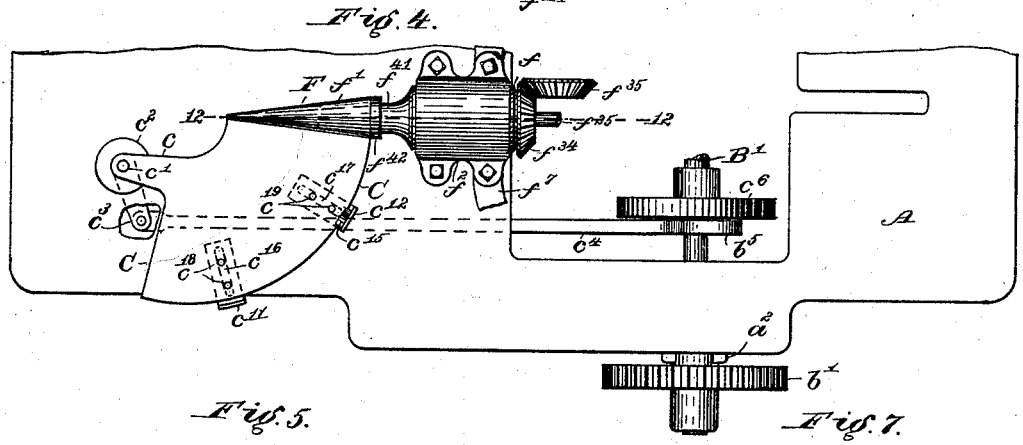
Figure 5:
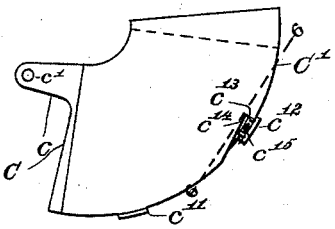
Figure 6:
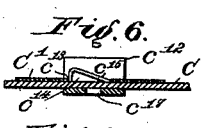
Figure 7:
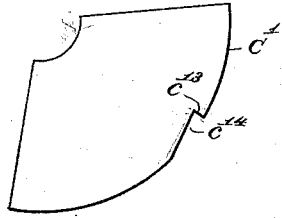
Figure 8:
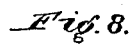
Figure 8:
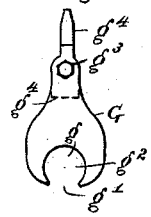
Figure 9:
Figure 10:
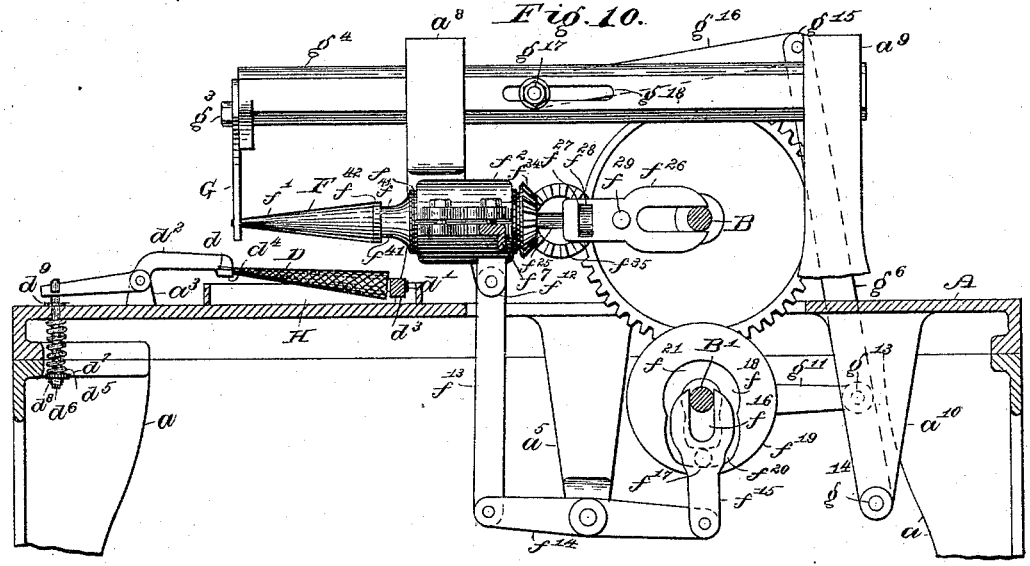
Figure 11:
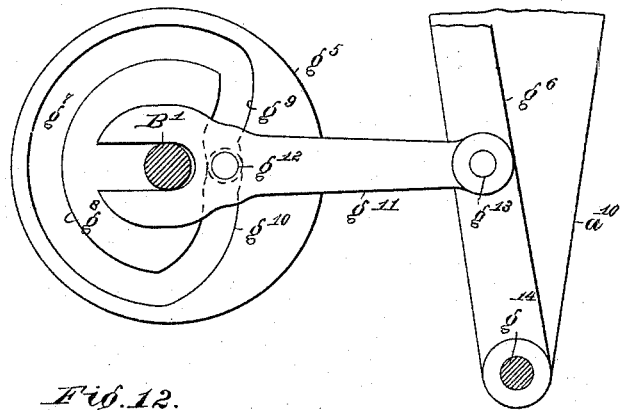
Figure 12:
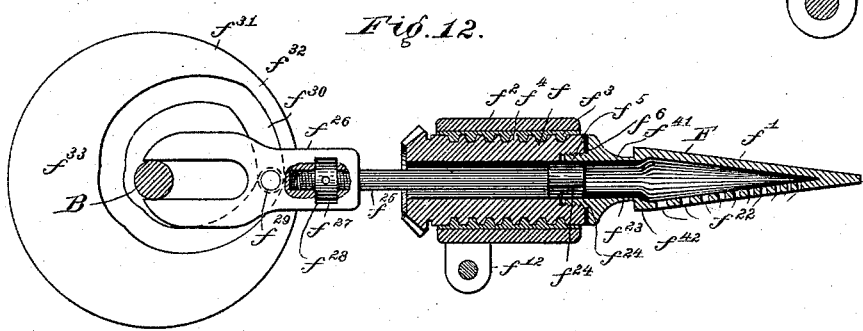
Figure 13:
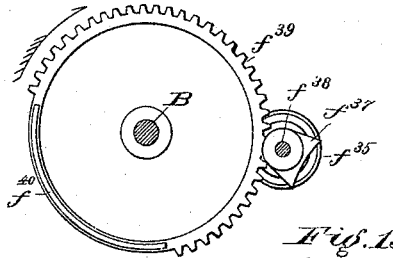
Figure 14:
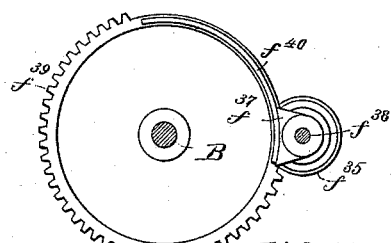
Figure 15:
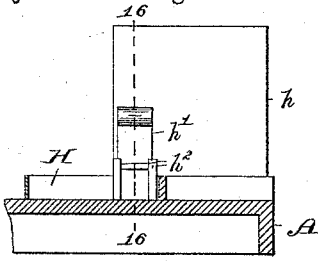
Figure 16:
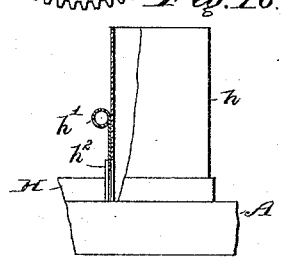
Figures 17, 18, 19:
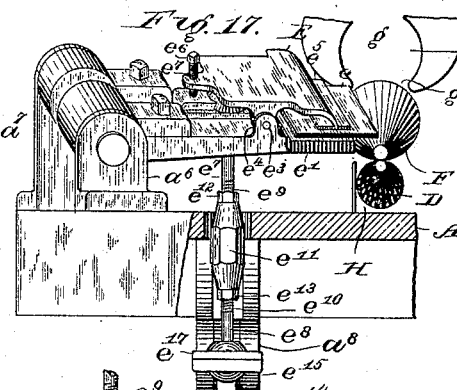

In the accompanying drawings, on four sheets, Figure 1 is a front elevation of a machine for making cones or tubes provided with my improvement; Fig. 2, a plan of the same; Fig. 3, a vertical section, on the line 3 3 in Fig. 2, of the bed, parts of the legs, the main shaft and lower shaft, the spindle-supporting yoke, and a front elevation of the feed-table, its supporting and operating parts, said spindle, part of the mutilated gear which rotates said spindle, the pinion engaged by said gear, and part of the bevel-gear fast on said spindle, omitting the bevel-gear which engages the bevel-gear above named and which is one with or fast to said pinion; Fig. 4, a plan of part of the bed, the feed-table, and its gages and operating mechanism, including the lower shaft, the spindle and bevel-gears, and the spur-gear fast on said lower shaft; Fig. 5, a plan of the feed-table and a cone-blank arranged thereon; Fig. 6, a section of the feed-table and blank on the line 6 6 in Fig. 5; Fig 7, a plan of a blank; Fig. 8, a left-end elevation of the spindle and stripper; Fig. 9, an isometric view of a finished cone or cone-tube; Fig. 10, a section of the table, the upper and lower shafts, one of the supporting-levers of the paste-roll, and spindle-supporting yoke on the line 10 10 in Fig. 2, showing in front elevation the other supporting-lever of the paste-roll, the restoring spring and rod of said last-named lever, said paste-roll, the spindle, the cam, lever, and rods which raise and lower the spindle, the combined piston-rod and cam-rod, means of varying the length of said combined rod, mechanism for rotating said spindle, the stripper-bar, stripper, stripper-lever, the stripper connecting-rod, and stripper cam-rod; Fig. 11, a front elevation of the stripper-cam and cam-rod, the lower part of the stripper-lever, and a vertical cross-section of the lower shaft and of the hanger which supports said stripper-lever; Fig. 12, a section on the line 12 12, Fig. 4, of the upper shaft, the spindle, and its journal-box, and a rear elevation of the piston, combined piston and cam-rod, and the cam which operates said piston; Fig. 13, a rear elevation of the mutilated gear and its stop-flange, the stop out of engagement with said flange, and the bevel-gear which rotates with said stop; Fig. 14, the same as Fig. 13, except that the stop is in engagement with the stop-flange; Fig. 15, a vertical section of the bed and paste-pool, showing the paste-box in left-side elevation; Fig. 16, a front elevation of part of the bed, pool, and paste-box, a part of said box being in vertical section on the line 16 16 in Fig. 15; Fig. 17, a left-end elevation of a part of the bed, the slicker and its holder, its connecting-rod, a part of the slicker-lever, the spindle, paste-roll, and a part of the stripper; Fig. 18, a section of the stripper, its holder, and a part of the stripper-lever at right angles to the shaft of said holder and a side elevation of its connecting-rod; Fig. 19, a vertical section of the bed and lower shaft on the line 19 19 in Fig. 2 and a front elevation of the stripper-cam, its cam-rod, stripper-lever, and connecting-rod.

The horizontal bed A of the machine herein described is supported upon suitable legs *a* and supports all the other parts of the machine. In stands *a'* turns the horizontal upper or main shaft B above said bed A and in hangers $a^2$ below said bed the lower shaft B' turns, said shafts B B' being parallel and connected by equal gears *b b'* fast on said shafts respectively.

The horizontal feed-table C (see Figs. 1 to 6) is almost the shape of a quadrant of a circle and is secured by means of the projection *c*, eccentrically, to the top of a vertical shaft *c'*, turning in a pipe-box $c^3$ which reaches down through the bed A, said shaft *c'* having at its lower end a forwardly-extending arm $c^3$, the free end of which is jointed to one end of the feed cam-rod $c^4$, the other end of said cam-rod having a guide-fork $c^5$ which receives and has a sliding fit on the lower shaft $B'$. The cam or cam-disk $c^6$ is fast on said lower shaft $B'$ and is provided with a cam-groove $c^7$, which receives a stud $c^8$ projecting from the cam-rod $c^4$, so that the rotation of the lower shaft causes said feed-table C to have an oscillating motion in a horizontal plane. The cam-groove $c^7$, as shown in Fig. 3, has two portions $c^9$ $c^{10}$, each concentric with the cam-disk $c^6$ and lower shaft $B'$ and each measuring about the same angular distance, these portions $c^9$ $c^{10}$ being respectively farthest from and nearest the center of said cam-disk so that the feed-table C rests at each end of its traverse for about one fourth of the time of revolution of said cam-disk $c^7$, the extreme front and rear positions of said feed-table being shown in Figs. 2 and 4, respectively.

The shape of the blank $C'$ is shown in Fig. 7, it having two curved edges which are (except as hereinafter stated) the arcs of concentric circles and two straight edges which are parts of radii of the larger circle, the lengths of the arcs depending upon the number of thicknesses of paper to be given to the walls of the tube and the lengths of the straight sides of the blank being the length of the slant side of the tube.

The blank $C'$ of thick paper or straw-board is placed on the feed-table so that its rear edge overlaps the rear straight edge of said feed-table as shown in Fig. 5, when said feed-table is in the position shown in Fig. 2, said blank being placed against the vertical parts of the gages $c^{11}$ $c^{12}$, with its overlapping part in the rear of its proper position and drawn forward until the rear radial side $c^{13}$ of a notch $c^{14}$ in the outer curved edge of the paper is drawn against the vertical back end of the inclined stop $c^{15}$, said stop being secured on and movable with the rear gage $c^{12}$ and serving to determine the distance to which the blank shall project beyond the rear straight edge of the feed-table. The gages $c^{11}$ $c^{12}$ are angle-pieces, adjustable radially on said feed-table by means of slots $c^{16}$ $c^{17}$ in their horizontal parts and screws $c^{18}$ $c^{19}$, passing up through said slots into the bottom of said feed-table, to enable blanks of different sizes to be placed on said feed-table. When the feed-table is swung backward to its extreme limit, the rear edge of the blank is carried over the paste-roll D and to the rear of the same.

The paste-roll D is a conical idle-roll, having a corrugated or roughened surface to take up the paste and provided with yielding bearings and with journals $d$ $d'$, supported in levers $d^2$ $d^3$ (Figs. 1, 2 and 10), pivoted in stands $a^3$ $a^4$ on the bed A, said levers $d^2$ $d^3$ being substantially alike, except that being, for convenience, arranged at about right angles to each other. The journal $d$ rests in an offset or lateral extension $d^4$ of the lever $d^2$ while the journal $d'$ is supported upon the lever $d^3$ at right angles thereto. The end of each supporting lever $d^2$ $d^3$, farthest from the paste-roll D is drawn downward by a spring $d^5$, surrounding a rod $d^6$ which hooks over said lever and slides vertically in a hole in the bed A, said spring being compressed between the bottom of said bed and a washer $d^7$, also surrounding said rod and adjustable thereon, to vary the compression of said spring, by a nut $d^8$, turning on said rod below said washer, and the downward movement of said rod $d^6$ being limited by a collar $d^9$ on said rod above said bed A. The blank C when thus moved backward over the paste-roll extends back of said roll and above the slicker E, hereinafter described, and below the conical spindle F which is then in the raised position shown in Figs. 3 and 10, but immediately descends upon the blank pressing the latter firmly down upon the yielding paste-roll D, the blank being compressed between said spindle and paste-roll by the expansive power of the springs $d^5$, above described.

The spindle F (Figs 1 to 4, 10 and 12) is made in two parts $f$ $f'$, a body $f$, turning in a two-part thrust-box or journal-box $f^2$ having internal annular grooves $f^3$ to receive corresponding collars $f^4$ on the body $f$, in a well known manner, and the hollow mandrel, former or spindle proper $f'$ on which the blank C is rolled into a cone or tube, the part $f'$ being detachable from the body $f$, to facilitate the construction of the spindle and to allow of the use of spindles or formers of different pitches or lengths, the part $f'$ having a reduced shank $f^5$ (Fig. 12) externally threaded and entering a threaded hole $f^6$ in the body $f$. The thrust-box $f^2$ is supported on a yoke $f^7$ (Fig. 2) formed in one with the lower half of the thrust-box $f^2$, said yoke having journal-boxes $f^8$ $f^9$ (except that they are supported by instead of supporting the main-shaft) in which the main shaft B turns freely and which allow said yoke to swing on said main-shaft, one branch $f^{10}$ of said yoke extending beyond said shaft B and carrying a weight $f^{11}$ to counterbalance the yoke and parts supported thereby.

The thrust box $f^2$ (Fig. 12) is provided with an ear $f^{12}$ to which is jointed one end of a connecting-rod $f^{13}$, the other end of said rod $f^{13}$ being jointed to one end of a lever $f^{14}$ having its fulcrum on the hanger $a^5$ and the other end of said lever $f^{14}$ being jointed to the lower end of the cam-rod $f^{15}$. The upper end of the cam-rod $f^{15}$ is forked at $f^{16}$, to receive and be guided by the lower shaft $B'$ and a stud $f^{17}$ projects from said cam-rod $f^{15}$ into the cam-groove $f^{18}$ of the cam-disk $f^{19}$ fast on said lower shaft. (See Fig. 10.)

The cam-groove $f^{18}$ has two portions $f^{20}$ $f^{21}$ concentric with the shaft B, the shorter concentric portion $f^{20}$ holding the spindle raised while the cone or tube is being stripped from the spindle and a new blank is being fed, and the longer concentric portion $f^{21}$ holding the spindle down and pressing the blank, or tube or cone being formed, against the paste-roll.

The part $f'$ of the spindle on which the blank is rolled is hollow, as shown in Fig. 12, and said spindle is provided with a straight row of perforations $f^{22}$, arranged in the plane of the axis of the spindle at the back of the spindle when said spindle is first applied to the blank and the hollow of the spindle-part $f'$ is cylindrical at $f^{23}$ near the body $f$ of said spindle and contains a piston $f^{24}$, the piston-rod $f^{25}$ of which extends through the body $f$ and is adjustably connected to the cam-rod $f^{26}$ by means of a nut $f^{27}$ which turns in a slot $f^{28}$ in said cam-rod and engages the threaded end part of said piston-rod, in an obvious manner, the piston-rod and cam-rod being in line with each other and being in effect a combined piston and cam-rod adjustable in length.

The cam-rod $f^{26}$ is substantially like the cam-rod $f^{15}$, being forked to receive and to be guided by the main shaft B and has a laterally-projecting stud $f^{29}$ which enters a cam-groove $f^{30}$ in a cam-disk $f^{31}$, fast on said main shaft, the rotation of said cam-disk causing the piston $f^{24}$ to have a reciprocating motion in the spindle, the piston resting for a short time at the end of the return stroke or while the finished cone is being removed from the spindle and while the spindle is being lowered upon the blank, the stud $f^{29}$ being then in the concentric part $f^{32}$ of the cam-groove, and resting for a shorter time at the end of the exhaust stroke while the cone is being formed, said stud $f^{29}$ being then in the concentric part $f^{33}$ of said cam-groove. The exhaustion of the air from the spindle causes the paper blank near its rear edge to adhere firmly to the spindle over the perforations $f^{22}$, so that when the spindle is rotated the blank is drawn from the table and wound around the spindle, the long side of the notch $c^{14}$ in the paper riding over the incline $c^{15}$ above described.

Immediately after the exhaustion of the air from the spindle, said spindle is rotated by the means described below, paste being applied to the blank by means of the paste-roll D which rotates by frictional contact with the blank and runs in a pool or tray H, in which said paste-roll is partly submerged, the paste being kept at a nearly constant height in said pool by a supply from the paste-box $h$ (Figs. 1, 2, 15 and 16), said paste-box being filled with paste above the top of said pool and being provided with a gate $h'$, sliding in suitable vertical ways $h^2$ and opening into said pool, said gate being raised when required to increase the height of the paste in said pool.

A bevel gear $f^{34}$ is fast on the body $f$ of the spindle and is engaged by another bevel-gear $f^{35}$, formed in one piece with or secured concentrically to a spur-pinion $f^{36}$ and to a stop-piece $f^{37}$ and with them turning on a horizontal stud $f^{38}$ which projects forward from the rear branch of the yoke $f^7$, (Figs. 1 to 4 and 10.) The pinion $f^{36}$ is rotated intermittently by the mutilated gear $f^{39}$ (Figs. 1 to 3, 10, 13, and 14), fast on the main shaft B, and through said bevel-gears, rapidly rotates the spindle while the spindle is in its lowest position. The mutilated gear $f^{39}$ is provided with a concentric arc-shaped stop-flange $f^{40}$, having an angular measurement sufficiently less than that of the untoothed portion of said gear $f^{39}$ to allow the stop $f^{37}$ to be out of engagement with said stop-flange when the pinion $f^{36}$ is in engagement with the mutilated gear. The stop $f^{37}$ has a concave face which fits the convex surface of the stop-flange and prevents the rotation of said stop and the pinion $f^{36}$ and therefore of the spindle during about one third of each revolution of the mutilated gear $f^{39}$.

The slicker E (Figs. 12, 17, 18, and 19) consists of a sheet $e$ of rubber, leather or similar flexible material, supported on a lever $e'$, so journaled in stands $a^6$ $a^7$ on the bed A as to bring the front edge of the sheet $e$ parallel with the axis of the spindle F when said spindle is in its lowest position, said sheet $e$ being held between said lever and the front end of a clamp $e^2$, pivoted between its ends, at $e^3$, in ears $e^4$ on said lever $e'$, the front end of said clamp being forced down on said sheet $e$, or on a strip $e^5$ of wood or metal resting on said sheet, by a screw $e^6$ which turns in a threaded hole $e^7$ in said clamp $e^2$ near the rear end thereof and thrusts against the top of said lever $e'$. A connecting-rod is formed in two parts $e^7$ $e^8$, the adjacent ends of which parts are screw-threaded at $e^9$ $e^{10}$ and are united by a right and left hand nut $e^{11}$, to enable the length of said rod to be varied, check-nuts $e^{12}$ $e^{13}$ being arranged above and below the nut $e^{11}$ to prevent its being accidentally turned. The connecting-rod $e^7$ $e^8$ is jointed to the lever $e'$ and to a bell-crank lever $e^{14}$ (having its fulcrum $e^{15}$ on a hanger $a^8$ supported by the bed A) by ball and socket-joints $e^{16}$ $e^{17}$, the lever $e^{14}$ being given a reciprocating motion by the cam-rod $e^{18}$ and slicker cam $e^{19}$, said cam-rod being like the cam-rods $e^4$ $f^{15}$ above described and like them guided by the lower shaft B' on which said cam $e^{19}$ is fast. A stud $e^{20}$ on the cam-rod $e^{18}$ projects into the cam-groove of the cam $e^{19}$ and, when the paper blank is first fed over the paste-roll, as above described, said stud is in the part $e^{21}$ of said groove, said part being concentric with and nearest the shaft B' and the slicker being in its lowest position. As soon as the spindle and paste-roll grasp the blank, the stud $e^{20}$ enters the part $e^{22}$ of the cam-groove, raising the front edge of the slicker and laying the rear edge of the blank against the back of the spindle F and over the perforations $f^{22}$, just before the air is exhausted from the spindle. Where the spindle begins to rotate, the slicker rises with the blank and above the spindle, as the receding part $e^{23}$ of the cam-groove acts on the stud $e^{20}$, and remains above and out of contact with the blank until the paper is wound one turn and a part of another turn about the spindle, said stud $e^{20}$ being meanwhile in the concentric part $e^{24}$ of said cam-groove, after which the part $e^{25}$ of said cam-groove brings the slicker against the paper where it remains until the concentric part $e^{26}$ of the cam-groove passes the stud $e^{20}$, laying the successive turns of paper smoothly on the preceding turns, pressing the outer lap down and removing the surplus paste from the paper or tube. The tube being finished, the spindle F is raised, as hereinbefore described, and the tube is removed from the spindle by means of a reciprocating stripper G, (see Figs. 1, 2, 8, 10, 11 and 17,) the same being a plate of metal, provided at its lower end with a downwardly-opening slot $g$, the lower end $g'$ of said slot being wide enough to admit the reduced neck $f^{41}$ of said spindle between the tube-shaping surface of said spindle and the thrust-box $f^2$, and said slot above its lower end being enlarged, at $g^2$, to fit the short cylindrical part $f^{42}$ of said spindle.

The stripper G is bolted, at $g^3$, to a slide $g^4$ which is given a longitudinal movement in stands $a^8 a^9$ by means of the stripper-cam $g^5$ and stripper-lever $g^6$, immediately after the spindle reaches its highest position. The stripper-cam $g^5$ is fast on the lower shaft B' and is provided with a cam-groove $g^7$, the greater portion $g^8$ of which is at a distance from and concentric with said shaft B' and the remaining portions $g^9 g^{10}$ of which suddenly approach and recede from said shaft, (see Fig. 11;) but this is not material in respect to the portion $g^{10}$, because the return movement of the stripper may occupy the whole time during which the tube is being wound.

The cam-rod $g^{11}$ is substantially like the cam-rods $c^4 f^{15} e^{18}$, being guided in a similar manner by the lower shaft, and is provided with a stud $g^{12}$ which enters said cam-groove $g^7$, one end of said cam-rod $g^{11}$ being pivoted at $g^{13}$ to the stripper-lever $g^6$ above its fulcrum $g^{14}$. The stripper-lever is pivoted on the hanger $a^{10}$ and its upper end is jointed, at $g^{15}$, to one end of the connecting-rod $g^{16}$, the other end of said rod $g^{16}$ being jointed to the slide $g^4$ by a pivot $g^{17}$, adjustable by well known means in a longitudinal slot $g^{18}$ in said slide, to adjust the starting and stopping points of the stripper with reference to the highest position of the spindle F.

I claim as my invention—

1. The combination of the paste-roll, the slicker, the spindle, means of rotating the same and means for lowering said spindle upon a blank, means of securing an edge of said blank to said spindle and means of subsequently raising said slicker against said blank to lay the edge of said blank against said spindle, as and for the purpose specified.

2. The combination of the paste-roll, the slicker, the feed-table, arranged to carry a side of a blank supported on said table over said paste-roll and slicker, the spindle, means of rotating the same means of lowering said spindle upon said blank, means of securing an edge of said blank to said spindle and means of subsequently raising said slicker against said blank to lay the edge of said blank against said spindle, as and for the purpose specified.

3. The combination of the swinging table, having radially-adjustable gages, the spindle means of rotating the same, means of securing an edge of a blank to said spindle and paste-roll, as and for the purpose specified.

4. The combination of the swinging table having radially-adjustable gages, the spindle, means of rotating the same, means of securing an edge of a blank to said spindle the paste-roll and the slicker, as and for the purpose specified.

5. The combination of the swinging table, having gages, one of said gages having an inclined stop, having a vertical back end, secured thereto, to enter a notch in the blank carried by said table, to determine the distance to which such blank shall project beyond the back of said table and to enable the front side of said notch to be drawn over said stop, the paste-roll the spindle, means for securing the edge of the blank to said spindle and means for rotating said spindle, as and for the purpose specified.

6. The combination of the intermittently-rotating spindle, having air-inlets in the side thereof, and a reciprocating piston, arranged in said spindle, to exhaust the air from said spindle and to cause a blank to adhere to said spindle, as and for the purpose specified.

7. The combination of the intermittently-rotating hollow spindle, having air-inlets in the sides thereof, the slicker, means of raising said slicker to lay the edge of a blank against said spindle over said air-inlets, and an intermittently - reciprocating piston arranged in said spindle, to exhaust the air from said spindle and to cause a blank to adhere to said spindle, as and for the purpose specified.

In witness whereof I have signed this specification, in the presence of two attesting witnesses, this 28th day of June, A. D. 1892.

JOHN C. CORAM.

Witnesses:
ALBERT M. MOORE,
MYRTIE C. BEALS.